3 Sheets--Sheet 1.

T. S. BATES.

Printing-Presses.

No. 5,879. Reissued May 19, 1874.

Witnesses,
W. Flambridge
Milo N. Robbins

Inventor,
Thomas S. Bates,
Per Teschemacher & Steams
Attorneys

3 Sheets--Sheet 2.

T. S. BATES.

Printing-Presses.

No. 5,879. Reissued May 19, 1874.

Witnesses,
W. J. Cambridge
Milo N. Robbins

Inventor,
Thomas S. Bates,
Per Terrell, Fenwick & Williams
Attorneys

3 Sheets--Sheet 3.

T. S. BATES.

Printing-Presses.

No. 5,879.

Reissued May 19, 1874.

Witnesses,
W. J. Cambridge
Milo N. Robbins

Inventor,
Thomas S. Bates,
Per Teschemacher & Stearns
Attorneys

5,879. PRINTING-PRESSES. Thos. S. Bates, Boston, Mass. Patent No. 145,610, dated Dec. 16, 1873. [Filed Feb. 13, 1874.]

*To all whom it may concern:*

Be it known that I, THOMAS S. BATES, of Boston, in the county of Suffolk and State of Massachusetts, have invented certain Improvements in Printing-Presses, of which the following is a full, clear, and exact description, reference being had to the accompanying drawings, making part of this specification, in which—

Figure 1:
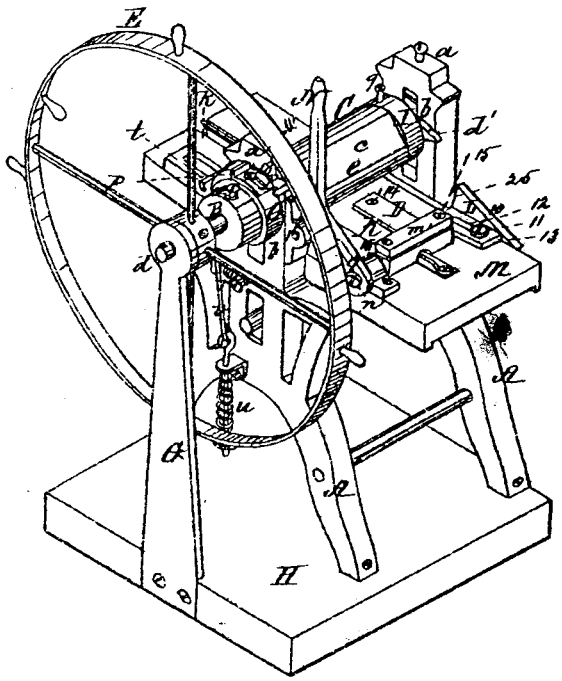
Figure 2:
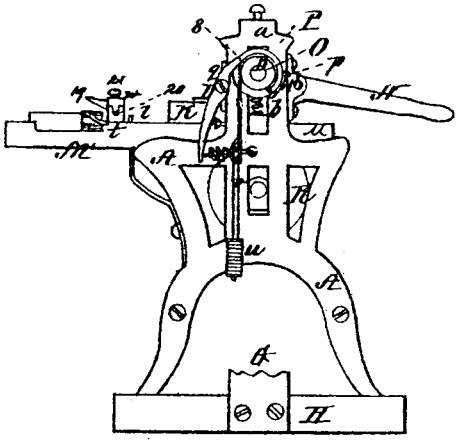
Figure 3:
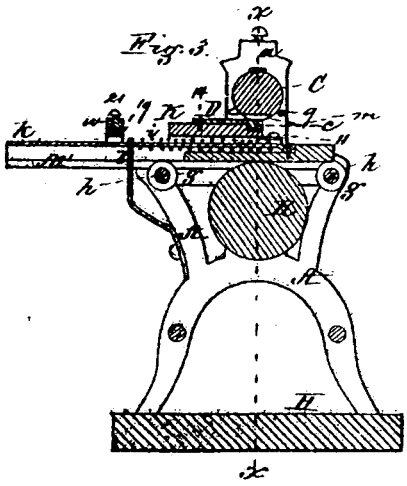
Figure 4:
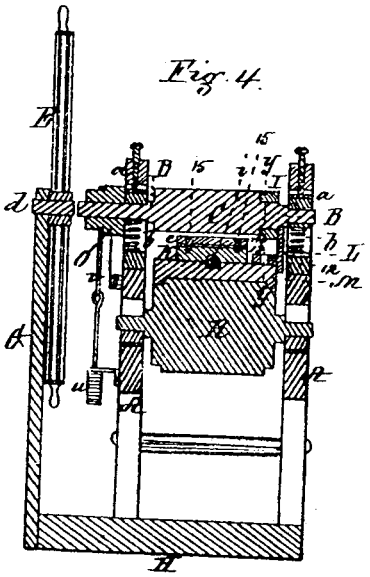
Figure 5:
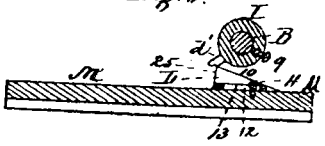

Figure 1 is a perspective view of a cylindrical plate-printing press with my improvements applied thereto. Fig. 2 is a side elevation of the same, the position of some of the parts being changed. Fig. 3 is a longitudinal vertical section through the center of the press, the position of the parts being the same as that represented in Fig. 2. Fig. 4 is a transverse vertical section on the line *x x* of Fig. 3. Fig. 5 is a vertical section on the line *y y* of Fig. 4.

To enable me to take an impression upon dry paper at a single operation, and to effect a saving in the time and labor required to print the work, is the object of my invention, which consists in a combination of the several devices hereinafter described.

To enable others skilled in the art to understand and use my invention, I will proceed to describe the manner in which I have carried it out.

In the said drawings, A is the frame-work, in upright portions *a a* of which, and on spring-bearings *b b* placed therein, rest the ends of a horizontal shaft, B, to which is secured a cylinder, C, flattened at *c*, in the form shown, in order that the pressure on the plate D may be discontinued when required to remove the work. To one end of the shaft B, outside the frame-work, is secured a fly-wheel, E, which may be disengaged therefrom when desired by throwing it laterally upon a short spindle, *d*, in line therewith, and projecting out from near the top of a standard, G, rising from the base H of the press. This fly-wheel is only intended to be used where long plates are employed for printing large or commercial work. Surrounding the other end of the shaft, inside the upright portion *a*, is a collar, I, provided with a projection, *d'*, the collar being adjusted on the shaft so that the projection *d'* may be placed in line with the front edge *e* of the flattened portion *c* of the cylinder when the longest plate is in position on its bed K. 9 is a screw for securing the collar in place when adjusted. This projection acts upon the inclined surface 10 of an adjustable wedge, L, secured in place upon the table M M', when adjusted by means of a screw, 11, passing through a slot, 12, formed in its lower flat portion 13, the wedge being moved to the back of the table, when a long plate, D, is to be used to give an impression. The inclined surface of the wedge must be carefully adjusted in order that the projection *d'* may move thereon a short distance before bringing the plate under the cylinder to receive its pressure, by which means sufficient space is left between the cylinder and plate to enable the operator to readily obtain access thereto, to cleanse it after each impression has been made. The movement of the cylinder moves the plate, and by the action of the projection upon the inclined surface of the wedge, I am enabled to employ a smaller cylinder than heretofore, and to operate it with less power than where a stationary projection on the cylinder acted on the vertical surface of an upright projection rising from the bed. The projection, being pressed on the incline by turning the wheel, moves the inclined surface under it. As the cylinder cannot move forward, the table must, therefore, move to the cylinder. The cylinder then revolves and gives a positive motion to the table, thus securing a compound power, which moves the table a distance equal the extent the incline travels, by the downward pressure of the projection, in addition to the positive movement given by the revolution of the cylinder. This compound movement enables me to use a much smaller cylinder to secure the same distance in the movement of the table, the object of which will be apparent to any one skilled in the operations of the press. The under side of the table M is provided with two flanges, extending down below it, which project over the outer faces of guide-wheels *g*, secured to rollers *h h*—one at the front and one at the rear of the table M. After the entire length of the plates has passed under the cylinder, the pressure thereon is discontinued by the flattened portion *c* coming around immediately over it, when the plate is instantly returned to the front of the machine by a spiral spring, *i*, surrounding a guide-rod, *k*, placed under the bed, the spring being compressed against a stop, *l*, by the advance movement of the sliding table, and being released the moment the cylinder ceases to act upon the plate. The plate is secured firmly to the bed by means of a screw, 14, passing through its rear end, and by a cleat, *m*, at its front end, made adjustable by screws 15, and provided with a beveled edge, under which the beveled edge of the front of the plate is snugly fitted, by which construction the upper surfaces of the plate and the cleat *m* are always flush with each other. Where short plates are to be used for producing light work, such as cards, &c., I prefer to move the table by operating a bent hand-lever, N, the lower end of which is provided with a slot, 17, for the reception of a projection, *n*, on the table. The portion of the lever where it is bent is pivoted to the frame-work at 16. By depressing the lever, the table is made to move away from the operator, thus bringing the plate into contact with the cylinder to revolve it. On the outside of one end of the shaft of the cylinder is fitted a collar, O, provided with a sliding slotted plate, P, secured to the shaft by means of a screw, 18, one end of the slotted plate being turned up so as to form a projection which serves as a stop, *p*, the position of which, relative to the front edge of the flattened portion *c*, is carefully adjusted so that the cylinder may only perform such portion of a revolution as may be necessary for the length of the plate in use, the back of the projection engaging with the heel 25 of the wedge immediately after the rounded portion of the cylinder leaves the plate, and the flattened portion *c* is brought directly over it, when a pawl, *q*, kept in constant contact with the collar O by a spiral spring, *r*, drops into a notch, *s*, in the collar, and holds the cylinder in this position out of contact with the plate, till the table with the plate is returned to its original position in front of the operator, to enable him to remove the impression just taken, when the movement of the table brings a projection, *t*, thereon against the lower end of the pawl, which compresses the spring *r*, and throws the upper end of the pawl *q* out of the notch, when the cylinder is turned a partial revolution by the recoil of a spiral spring, *u*, connected by a cord, *v*, with the end of the cylinder, till the stop *p* strikes against the pawl, and prevents the further turning of the cylinder, the extent of the partial revolution being just sufficient to return the cylinder into the precise position it had before, being that ready for exerting pressure upon the plate, as required. The table is supported by a large roll, R, placed directly under the center of the cylinder where the pressure would be brought upon the plate. *w* is a clamp composed of two jaws, 19 19, pivoted together at 20, for securely holding the strip or strips of paper placed over the paper which receives the impression, a screw, 21, being provided for keeping the upper jaw down upon the strip or strips, whereby the position of the "emboss" is not changed, and correct impressions are insured.

When the machine is to be operated by the wheel, the wedge is adjusted at the end of the table marked M′ so that the point of the projection *d′* rests on the top of the incline. The wheel being put in motion, the pressure of the projection on the incline forces the table forward until the projection can revolve with the cylinder, and thus continue the motion of the table till the cylinder engages with the plate on the bed, and produces the impression, after which the table is driven back by the spiral spring *i*, the wedge returning the cylinder to its proper position. When the cylinder is to be operated by the lever, the wedge is adjusted as shown in Fig. 1, and on the completion of the impression, its heel continues the revolution of the cylinder till the flat part thereof is parallel with the bed, when the pawl *q* at stop *s* will hold the cylinder while the table is returned by the spiral spring *i*, upon which the projection *t* releases the pawl, and the cylinder is revolved by the spring-rod and cord *u v*, till the pawl *q* rests at the stop *p*.

It will be seen from the foregoing that I am enabled to use a smaller cylinder, and obtain an increase of power sufficient to obtain a succession of perfect impressions on dry paper, thereby dispensing with the employment of a separate press to return the paper when dampened to its original dry, smooth, and hard condition, rendered necessary by the ordinary construction of printing-presses, and I am also enabled to economize much time and labor in producing impressions of light work by the application of my invention thereto.

What I claim as my invention, and desire to secure by Letters Patent, is—

1. The D-shaped cylinder C, stop *s*, adjustable stop *p*, and projections *t* and *d′*, in combination with the heel 25 of an adjustable wedge, L, table M M′, and lever N, the spring-pawl *q r*, and spring-rod and cord *u v*, substantially as and for the purpose set forth.

2. The D-shaped cylinder C and projection *d′*, in combination with the inclined surface 10 of the adjustable wedge L and fly-wheel E, or a series of spokes or arms, as and for the purpose described.

Witness my hand this 3d day of February, 1874.

THOS. S. BATES.

In presence of—
N. W. STEARNS,
W. J. CAMBRIDGE.